(12) United States Patent
Lim et al.

(10) Patent No.: US 9,513,540 B2
(45) Date of Patent: Dec. 6, 2016

(54) LASER PROJECTION DISPLAY AND METHOD FOR ALIGNING COLOR OF THE SAME

(71) Applicant: LG ELECTRONICS INC., Seoul (KR)

(72) Inventors: Jaehyuk Lim, Seoul (KR); Jideok Kim, Seoul (KR); Jaewook Kwon, Seoul (KR); Jaeho Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 14/625,260

(22) Filed: Feb. 18, 2015

(65) Prior Publication Data

US 2015/0350588 A1 Dec. 3, 2015

(30) Foreign Application Priority Data

May 27, 2014 (KR) ........................ 10-2014-0063588

(51) Int. Cl.
*G03B 21/14* (2006.01)
*G03B 21/20* (2006.01)
(Continued)

(52) U.S. Cl.
CPC ......... *G03B 21/2066* (2013.01); *G02B 26/101* (2013.01); *G03B 21/142* (2013.01);
(Continued)

(58) Field of Classification Search
CPC . G02B 26/101; G03B 21/142; G03B 21/2066; G09G 5/026; H04N 5/7458; H04N 9/3129; H04N 9/317; H04N 9/3185; H04N 9/3194
See application file for complete search history.

(56) References Cited

U.S. PATENT DOCUMENTS

2010/0002152 A1 1/2010 Nishioka et al.
2010/0302513 A1 12/2010 Takahashi et al.
(Continued)

FOREIGN PATENT DOCUMENTS

WO 2014/023322 2/2014

OTHER PUBLICATIONS

European Patent Office Application Serial No. 151619327, Search Report dated Nov. 5, 2015, 6 pages.
(Continued)

*Primary Examiner* — Sultan Chowdhury
*Assistant Examiner* — Magda Cruz
(74) *Attorney, Agent, or Firm* — Lee, Hong, Degerman, Kang & Waimey

(57) ABSTRACT

There is disclosed a laser projection display including a light source unit for emitting light laser light; a light resolution unit for resolving the laser light into a first light and a second light; an optical scanner for realizing an image by scanning the resolved first light to a screen; a sensing unit for sensing the resolved second light; and an alignment compensation unit for calculating location variation of the second light sensed by the sensing unit and compensating color alignment to correspond to the calculated location variation value, wherein a distance between a light emitting surface of the light resolution and a light incidence surface of the optical scanner is equal to a distance between a light emitting surface of the light resolution unit and a light incidence surface of the sensing unit.

20 Claims, 12 Drawing Sheets

(51) Int. Cl.
*H04N 5/74* (2006.01)
*G09G 5/02* (2006.01)
*G02B 26/10* (2006.01)
*H04N 9/31* (2006.01)

(52) U.S. Cl.
CPC ........... *G09G 5/026* (2013.01); *H04N 5/7458* (2013.01); *H04N 9/317* (2013.01); *H04N 9/3129* (2013.01); *H04N 9/3185* (2013.01); *H04N 9/3194* (2013.01)

(56) References Cited

U.S. PATENT DOCUMENTS

2011/0102763 A1* 5/2011 Brown .................... G01S 7/481
356/4.01
2012/0032875 A1 2/2012 Sprowl et al.

OTHER PUBLICATIONS

European Patent Office Application Serial No. 151619327, Search Report dated Mar. 4, 2016, 16 pages.

* cited by examiner

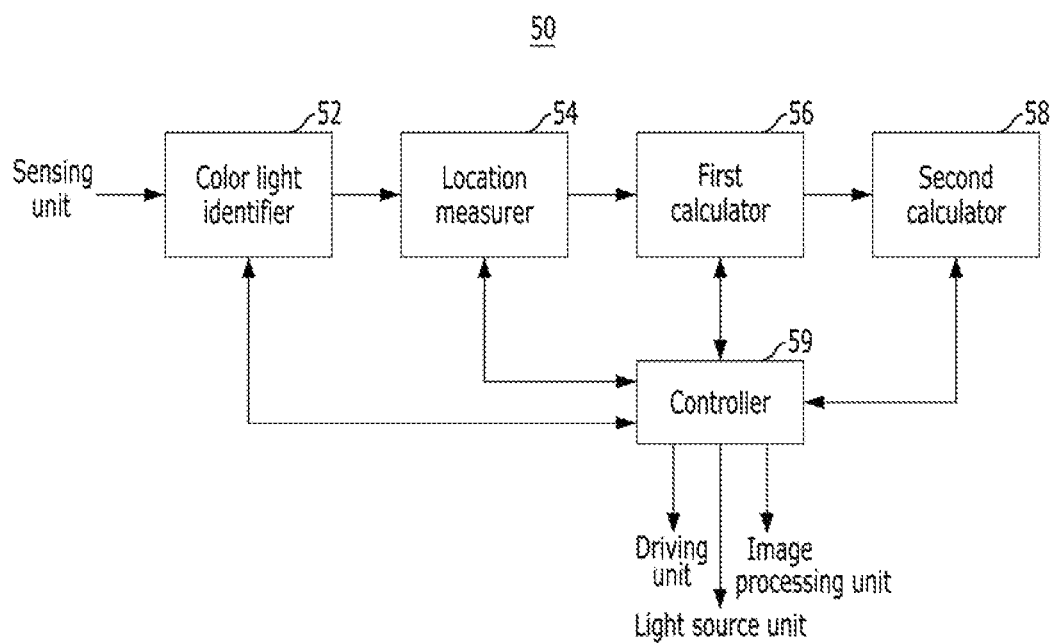

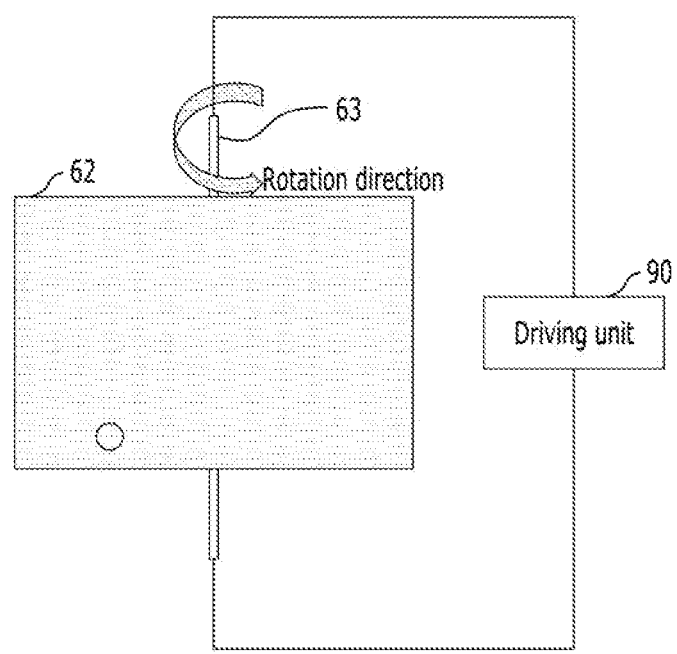

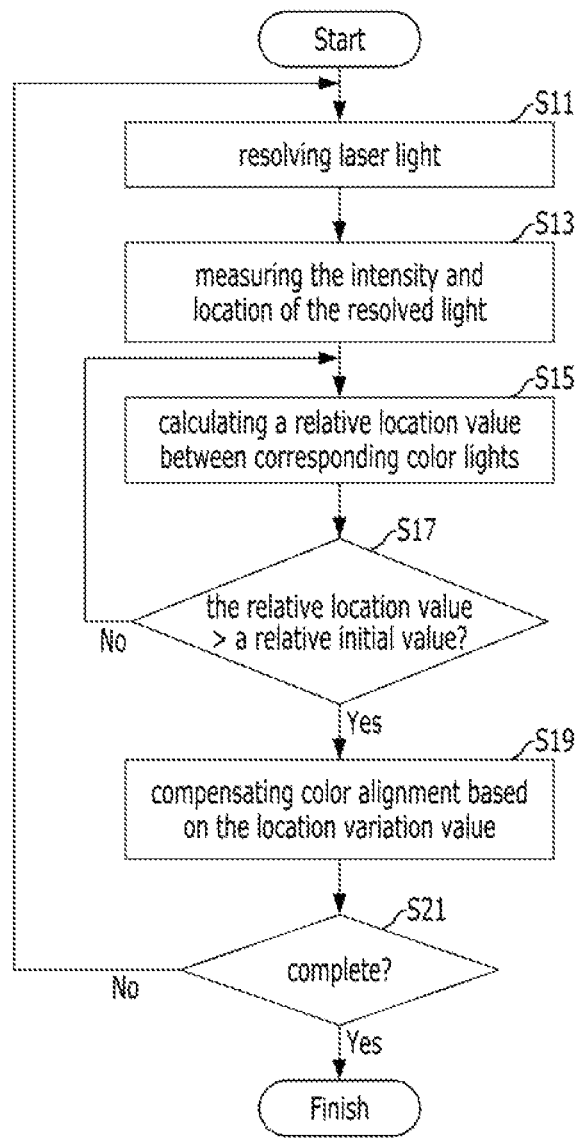

LASER PROJECTION DISPLAY AND METHOD FOR ALIGNING COLOR OF THE SAME

CROSS-REFERENCE TO RELATED APPLICATIONS

Pursuant to 35 U.S.C. §119(a), this application claims the benefit of earlier filing date and right of priority to Korean Application No. 10-2014-0063588, filed on May 27, 2014, the contents of which are hereby incorporated by reference herein in their entirety.

BACKGROUND OF THE DISCLOSURE

1. Field of the Disclosure

Embodiments of the present disclosure relates to a laser projection display, more particularly, to a laser projection display which may sense and compensate misalignment between each colors automatically, and a method for aligning colors of the same.

2. Background of the Disclosure

In general, rapid progress to a multimedia society requires enlargement and a high quality of a display screen. Recently, it is getting more important in a display screen to realize natural colors together with a high image resolution.

So as to realize perfect natural colors, it is essential to a light source having a high color purity (e.g., a laser). Examples of a device which realizes an image, using a laser, includes a laser projection display using an optical scanner.

Such a laser projection display realizes an image by scanning the laser beam generated from a laser light source, using an optical scanner. Alignment of a red light, a green light and a blue light is an important factor in realizing a high resolution and quality image.

If misalignment of the colors occurs, an image realized on a screen looks vague and this results in a disadvantage of a deteriorated image resolution and quality.

Accordingly, in case of increasing power consumption for laser light sources to compensate the lost light intensity caused by the misalignment of the colors, luminous efficiency of a system may deteriorate disadvantageously.

The misalignment between each two of the colors could be generated by an optical or mechanical factor of a laser projector display system or by an environmental factor such as a temperature, a shock and vibration.

There are ongoing demands for a laser projection display which may compensate misalignment between each two of the colors simply and automatically.

SUMMARY OF THE DISCLOSURE

An object of the present disclosure is to provide a laser projection display which may reduce power consumption and improve luminous efficiency by automatically compensating color alignment to correspond a location variation of a light calculated per a preset time period by sensing some of laser beams before incident on an optical scanner, and a method for aligning colors of the same.

To achieve these objects and other advantages and in accordance with the purpose of the disclosure, as embodied and broadly described herein.

Embodiments of the present disclosure may provide a laser projection display including a light source unit for emitting light laser light; a light resolution unit for resolving the laser light into a first light and a second light; an optical scanner for realizing an image by scanning the resolved first light to a screen; a sensing unit for sensing the resolved second light; and an alignment compensation unit for calculating location variation of the second light sensed by the sensing unit and compensating color alignment to correspond to the calculated location variation value, wherein a distance between a light emitting surface of the light resolution and a light incidence surface of the optical scanner is equal to a distance between a light emitting surface of the light resolution unit and a light incidence surface of the sensing unit.

The alignment compensation unit may include a color light identifier for measuring the intensity of the second light sensed by the sensing unit and for identifying whether the second light is red, green, blue or infrared light based on the measured intensity; a location measurer for measuring a location of the color light identified by the color light identifier; a first calculator for calculating a relative location value between corresponding color lights out of the location values of the color lights measured by the location measurer; a second calculator for comparing the relative location value between the color lights calculated by the first calculator with a preset relative location initial value and for calculating a location variation value based on the result of the comparison; and a controller for controlling the color identifier, the location measure and the first and second calculators and for compensating the color alignment based on the location variation value calculated by the second calculator.

Embodiments of the present disclosure may also provide a method for color alignment of a laser projection display in which a distance between a light resolution unit and an optical scanner is equal to a distance between the light resolution unit and a sensing unit, the method including resolving a laser light emitted from the light source unit into a first light for realizing an image and a second light for color alignment; measuring the intensity of the resolved second light and identifying whether the second light is red, green, blue or infrared light; measuring a location of the identified color light; calculating a relative location value between corresponding color lights out of the measured location values of the color lights; comparing the calculated relative location value between the color lights and a preset relative initial value and calculating a location variation value based on the result of the comparison; and compensating the color alignment based on the calculated location variation value.

BRIEF DESCRIPTION OF THE DRAWINGS

Arrangements and embodiments may be described in detail with reference to the following drawings in which like reference numerals refer to like elements and wherein:

FIG. 2 is a block diagram of an alignment compensation unit shown in FIG. 1;

FIGS. 4A through 4C are schematic diagrams illustrating a dichroic mirror shown in FIG. 1;

FIG. 9 is a flow chart illustrating a method for aligning colors of the laser projection display according to the present disclosure.

DESCRIPTION OF SPECIFIC EMBODIMENTS

Figure 1:
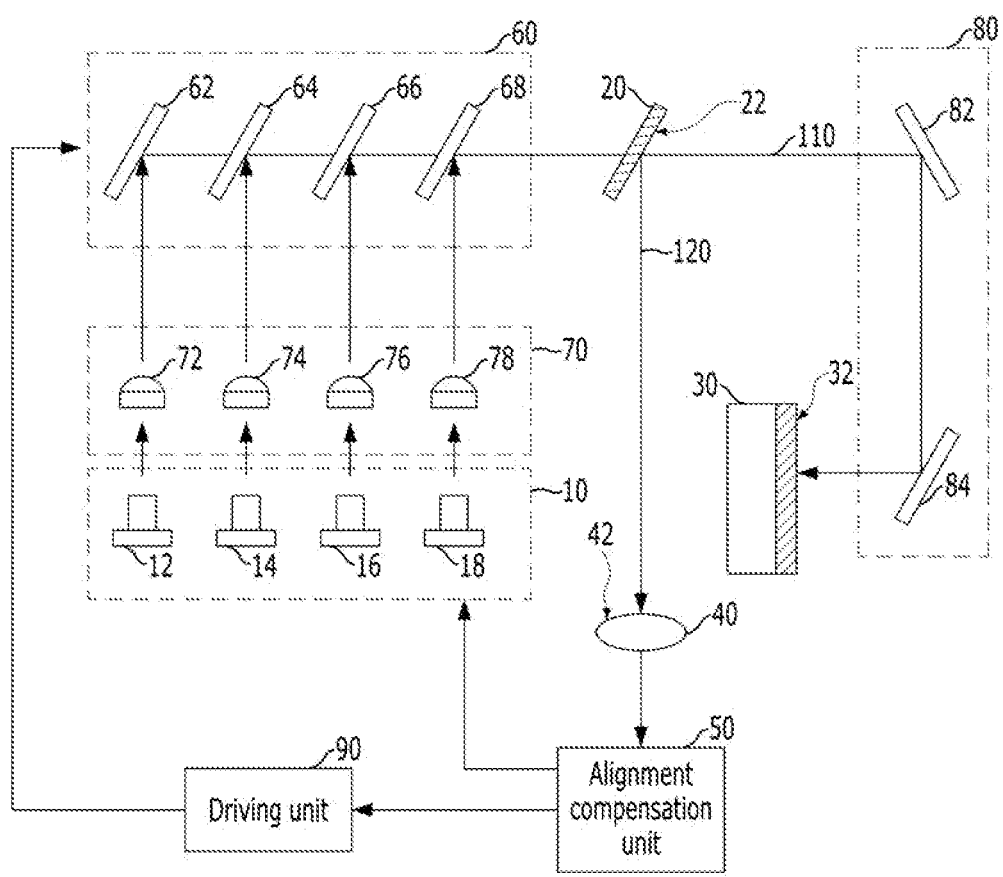
FIG. 1 is a diagram schematically illustrating a laser projection display according to one embodiment of the present disclosure.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

Suffixes of elements such as "module" and "unit" which are used in the following description are used in consideration of easy specification creation and they are not distinguished from each other. Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing. Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Examples of a laser projection display described in the present disclosure may include a projector including a laser light source, a micro-display and a micro optical device and so on.

For example, such a laser projection display may be applied to a mobile terminal. Examples of a mobile terminal may include a cellular phone, a smart phone, a laptop computer, PDA (Personal Digital Assistants), PMP (Portable Multimedia Player), Navigation, a slate PC, a tablet PC, a ultrabook, a wearable device (e.g., a smartwatch), a smart glass, HMD (Head Mounted Display) and so one.

However, it is obvious for people skilled in the art to know well that configurations of embodiments of the present disclosure may be applied to a fixed terminal (e.g., a digital TV, a desktop computer, a digital signage) except embodiments applicable only to a mobile terminal.

FIG. 1 is a diagram schematically illustrating a laser projection display according to one embodiment of the present disclosure.

The laser projection display shown in FIG. 1 may include a light source unit 10, a light resolution unit 20, an optical scanner 30, a sensing unit 40 and an alignment compensation unit 50.

At this time, a distance between a light emitting surface 22 of the light resolution unit 20 and a light incidence surface 32 of the optical scanner 30 may be equal to a distance of a light emitting surface 22 of the light resolution unit 20 and a light incidence surface 42 of the sensing unit 40.

The reason why the distances are equal is to measure the intensity and location of the light incident on the optical scanner 30.

Specifically, the intensity and location of the light incident on the optical scanner 30 may be designed to be equal to the intensity and location of the light incident on the sensing unit 40.

When the location of the light incident on the optical scanner 30 is moved as far as a first distance, it can be said that the location of the light incident on the sensing unit 40 is also moved as far as a first distance. Accordingly, variation of the locations is measured and color alignment can be compensated based on the measured variation.

A light passage of a first light 110 having arrived at the optical scanner 30 from the light resolution unit 20 is as long as a light passage of a second light 120 having arrived at the sensing unit 40 from the light resolution unit 20.

Alternatively, the time taken for the first light 110 to arrive at the optical scanner 30 from the light resolution unit 20 may be equal to the time taken for the second light 120 to arrive at the sensing unit 40 from the light resolution unit 20.

The light source unit 10 may emit laser beams and it may include at least one of a first light source 12 for generating a red light, a second light source 14 for generating a green light, a third light source 16 for generating a blue light and a fourth light source 18 for generating an infrared light.

A dichroic mirror unit 60 may be arranged between the light source unit 10 and the light resolution unit 20. A lens unit 70 may be arranged between the light source unit 10 and the dichroic mirror unit 60 to parallelize laser lights.

The lens unit 70 may be a collimating lens and it may include a first lens 72 for parallelizing the red light generated in the first light source 12, a second lens 74 for parallelizing the green light generated in the second light source 14, a third lens 76 for parallelizing the blue light generated in the third light source 16 and a fourth lens 78 for parallelizing the infrared light generated in the fourth light source 18.

The dichroic mirror unit 60 may include a first dichroic mirror 62 for reflecting the red light generated in the first light source 12, a second dichroic mirror 64 for reflecting the green light generated in the second light source 14, a third dichroic mirror 66 for reflecting the blue light generated in the third light source 16 and a fourth dichroic mirror 68 for reflecting the infrared light generated in the fourth light source 18.

In other words, the dichroic mirrors provided in the dichroic mirror unit 60 may be arranged, corresponding to the light sources provided in the light source unit 10 one by one.

The dichroic mirror unit 60 may include dichroic mirrors having at least one shaft and a driving unit 90 for rotating a reflection surface of a dichroic mirror.

The driving unit 90 may be arranged in the dichroic mirror unit or outside the dichroic mirror unit 60.

The light resolution unit 20 may resolve the laser light into a first light 110 and a second light 120.

For instance, the light resolution unit 20 as a photodiode filter may reflect some light to the light sensing unit 40 and allow the other light incident on the optical scanner 30.

At this time, film may be coated on a surface of the light resolution unit 20 to adjust the amount of transmitted light or reflected light to be different from each other based on a wavelength of the light.

Accordingly, the light resolution unit 20 may resolve the laser light into the first light 110 and the second light at a different rate. Alternatively, the light resolution unit 20 may resolve the laser light into the first and second lights at the same rate.

For instance, when the light resolution unit 20 resolves the laser light, the resolution rate of the first light 110 may be larger than that of the second light 120.

That is because the first light 110 is for realizing an image and the second light 120 is for measuring color alignment, only to enhance brightness of the realized image.

The resolution rate of the first light to the second light 120 may be approximately 1:0.9~1:0.01.

The light reflection unit 80 may be arranged between the optical scanner 30 and the light resolution unit 20, to change a passage of light.

The light refection unit 80 may have a plurality of reflection mirrors 82 and 84 arranged based on a design of an optical system in various methods.

The optical scanner 30 scans the resolved first light 110 to a screen and realizes an image.

Specifically, when the first light 110 is incident on a light incidence surface 32 of the optical scanner 30, the optical scanner 30 may scan the first light 110 to the screen through horizontal and vertical driving, only to realize the screen.

The sensing unit 40 may sense the resolved light 120. For example, the sensing unit 40 as a photodiode sensor may be a quadrant photodetector.

Using the quadrant photodetector as the sensing unit 40, the intensity and location of the light may be measured to measure a relative location between each two of the color lights.

The alignment compensation unit 50 may calculate a location variation of the second light 120 sensed by the sensing unit 40 by time and compensate the color alignment, corresponding to the calculated location variation value.

The alignment compensation unit 50 may calculate a rotation angle of the dichroic mirror arranged between the light source unit 10 and the light resolution unit 20 and controls rotation of the dichroic mirror based on the calculated rotational angle, only to compensate the color alignment.

Figure 3A:
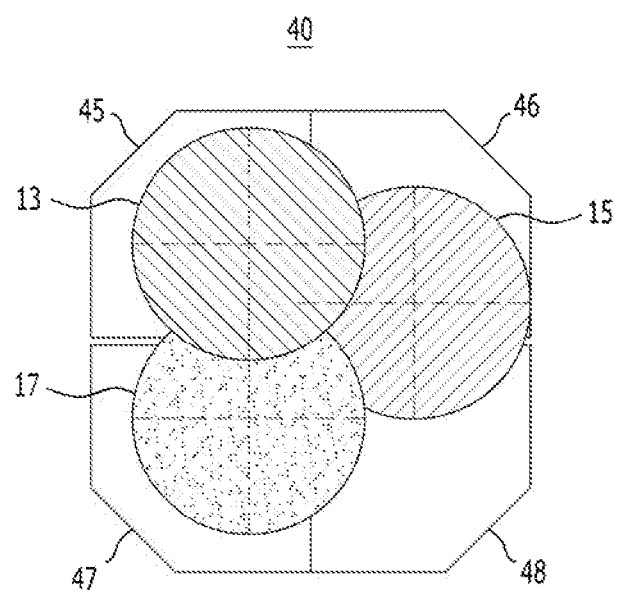
FIGS. 3A and 3B is a diagram illustrating a sensing unit and a location of a light incident on an optical scanner shown in FIG. 1.
Figure 3B:
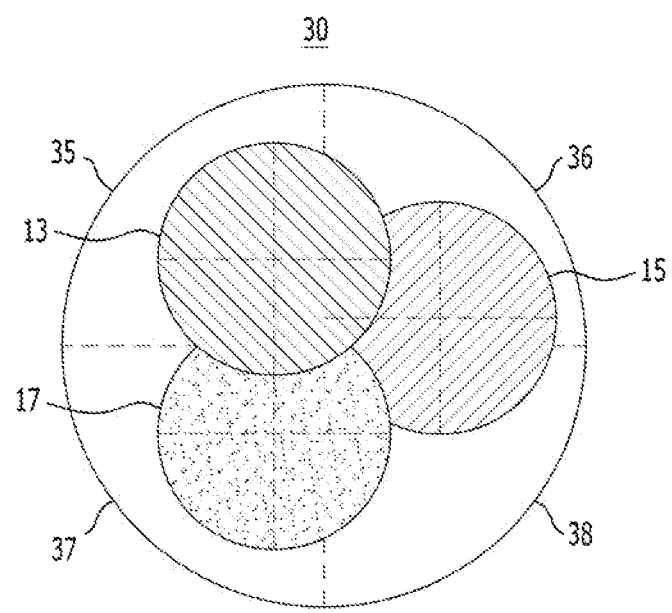

FIG. 2 is a block diagram of an alignment compensation unit shown in FIG. 1. FIG. 3A is a diagram illustrating a location of a light incident on a sensing unit shown in FIG. 1, and FIG. 3B is a diagram illustrating a location of a light incident on an optical scanner shown in FIG. 1.

The alignment compensation unit 50 shown in FIG. 2 may include a color light identifier 52, a location measurer 54, first and second calculators 56 and 58 and a controller 59.

The color light identifier 52 may measure the intensity of the second light 120 sensed by the sensing unit in accordance with a control signal of the controller 59 and compare the measured intensity of the light with a reference intensity value of a preset color light, only to identify the color of the light.

The location measurer 54 may measure a location of the color light identified by the color light identifier 52 in accordance with a control signal of the controller 59.

As shown in FIG. 3A, the sensing unit 40 is divided four regions including a first region 45, a second region 46, a third region 47 and a fourth region 48. The location measurer 54 may measure the location of the color light based on a light distribution rate in the first, second third and fourth regions 45, 46, 47, 48.

For instance, the location measurer 54 may detect that red light 13 is located in the first region 45, when a distribution rate of red light 13 is the highest in the first region 45, and that green light 15 is located in the second region 46, when a distribution rate of green light 15 is the highest in the second region 46. It may also detect that blue light 17 is located in the third region 47, when a distribution rate of blue light 17 is the highest in the third region 47.

Also, as shown in FIG. 3B, the optical scanner 30 is divided four regions including a first region 35, a second region 36, a third region 37 and a fourth region 38. In the optical scanner 30, as the location of the color light of the sensing unit 40, the distribution rate of red light 13 is the highest in the first region 35 of the optical scanner 30, and the distribution rate of green light 15 is the highest in the second region 36 of the optical scanner 30. Also, the distribution rate of blue light 17 is the highest in the third region 37 of the optical scanner 30. Accordingly, the sensing unit 40 may be a quadrant photodetector which is divided four regions including the first, second, third and fourth regions 45, 46, 47, 48, as the optical scanner 30.

The first calculator 56 may calculate a relative location value between corresponding color lights out of location values of the color lights measured by the location measurer 54.

The first calculator 56 may calculate the relative location value of the corresponding color lights based on a preset relative location initial value.

For example, a preset relative location initial value is a first relative value between red light and green light, a second relative location value between green light and blue light and a third relative value between blue light and red light. In this instance, the first calculator 56 may calculate the first relative location value between the red light and the green light, the second relative location value between the green light and blue light and the third relative value between the blue light and the red light.

The second calculator 58 may calculate location variations based on a result of comparison between the relative location values between the color lights calculated by the first calculator 56.

The controller 59 may calculate a rotational angle of the dichroic mirror arranged between the light source unit 10 and the light resolution unit 20 and control the driving unit to control the rotation of the dichroic mirror, only to compensate the color alignment.

If necessary, the controller 59 may compensate the color alignment by controlling the image processing unit to process an image based on the location variation value.

Alternatively, the controller 59 may enhance an optical power of the laser light by controlling the light source unit 10 when the intensity of the second light 120 sensed by the sensing unit 40 is smaller than a reference value.

When the intensity of the second light 120 sensed by the sensing unit 40 is smaller than a reference value, the intensity of the light and the location detection value are small enough to make it difficult to identify color lights. Also, there could be an error in the calculated location variation value and reliability might deteriorate accordingly.

The embodiment of the present disclosure is designed to make the intensity and location of the light incident on the optical scanner 30 equal to those of the light incident on the sensing unit 40. The location variation of the light incident on the sensing unit 40 may be detected, such that the color alignment can be compensated in accordance with a mechanical method for changing the rotation angle of the dichroic mirror based on the location variation or a circuit method for controlling the image process of the image processing unit.

Figure 4B:
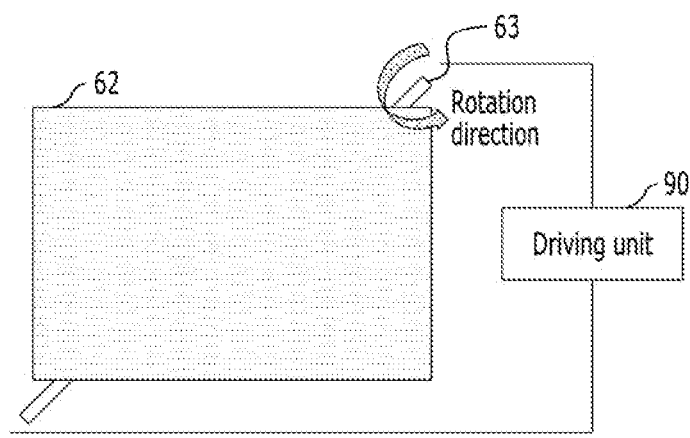
Figure 4C:
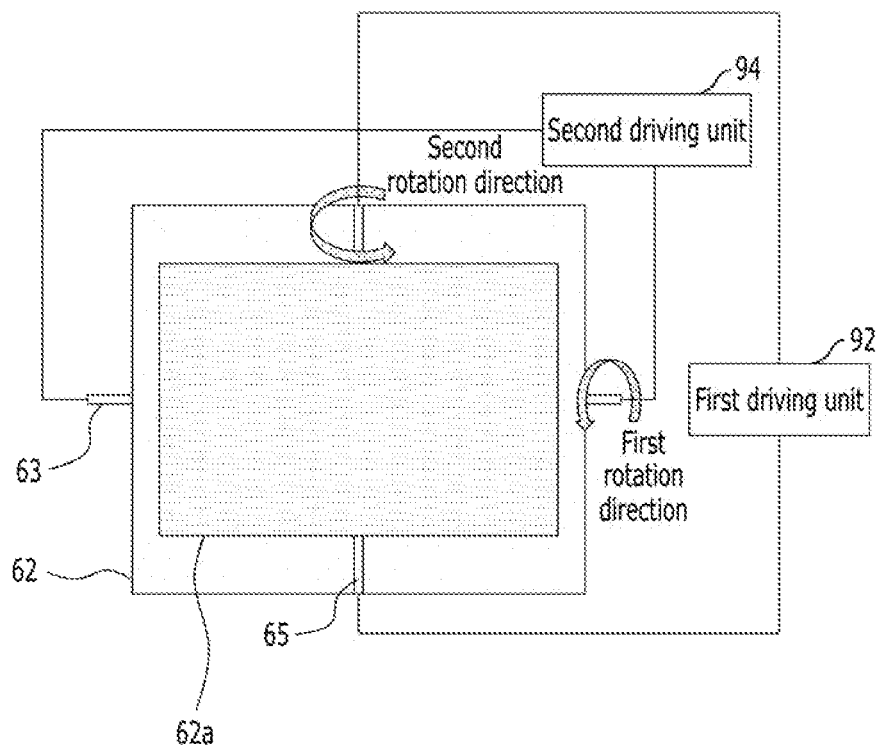

FIGS. 4A through 4C are schematic diagrams of the dichroic mirror shown in FIG. 1. FIG. 4A illustrates a dichroic mirror rotatable on Y-axis and FIG. 4B illustrates a dichroic mirror rotatable on a diagonal direction between X-axis and Y-axis. FIG. 4C illustrates a dichroic mirror rotatable on X-axis and Y-axis.

As shown in FIGS. 4A through 4C, the dichroic mirror 62 is coupled to at least one shaft 63 in communication with each other and the shaft 63 can rotate in communication with the driving unit 90.

An actuator, a stepping motor or a piezoelectric motor may be used as the driving unit 90.

The driving unit 90 may rotate the shaft 63 a preset angle in accordance with a control signal of the alignment compensation unit.

At this time, the dichroic mirror 62 shown in FIG. 4A may be rotated a preset angle by the shaft 63 rotating on Y-axis based on a driving signal of the driving unit 90. The dichroic mirror 62 shown in FIG. 4B may be rotated a preset angle by the shaft 63 rotating on a diagonal axis between the X-axis and Y-axis based on a driving signal of the driving unit 90. The dichroic mirror 62 shown in FIG. 4C may be rotated a preset angle by the first shaft 63 rotating one X-axis based on a second driving signal of a second driving unit 94 and a second shaft 65 rotating on Y-axis based on a first driving signal of a first driving unit 92.

Figure 5:
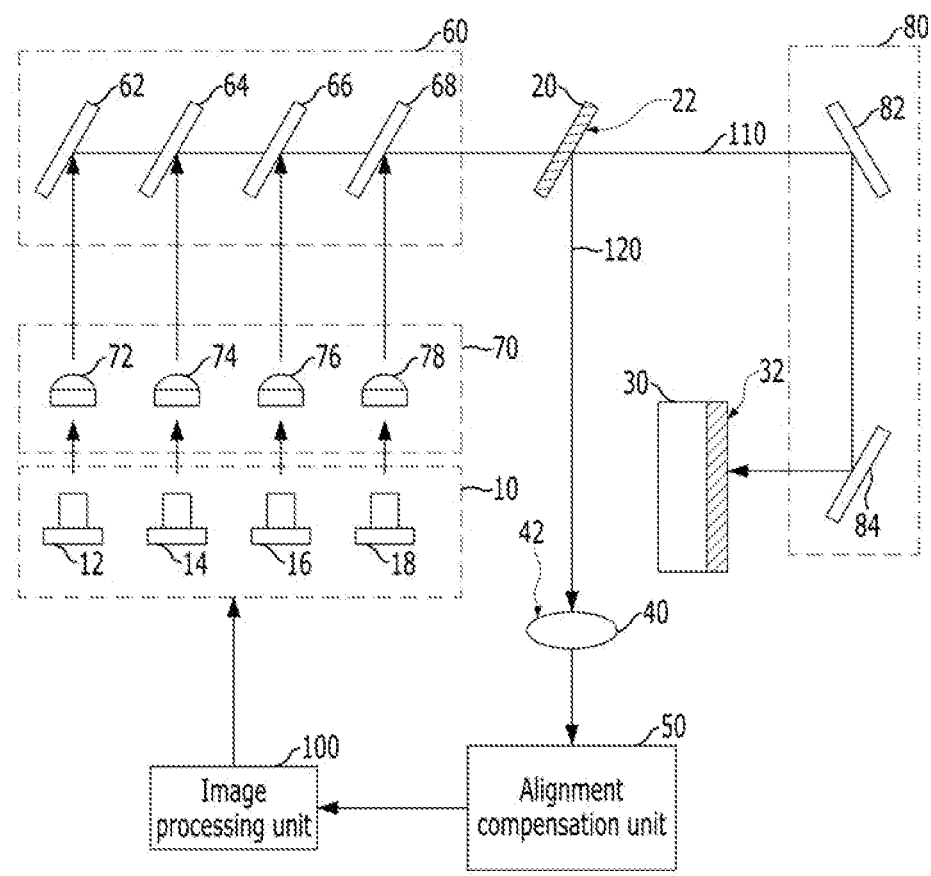
FIG. 5 is a diagram schematically illustrating a laser projection display according to another embodiment of the present disclosure.

FIG. 5 is a diagram schematically illustrating a laser projection display in accordance with another embodiment of the present disclosure.

The laser projection display shown in FIG. 5 may include a light source unit 10, a light resolution unit 20, an optical scanner 30, a sensing unit 40 and an alignment compensation unit 50.

At this time, a distance between a light emitting surface 22 of the light resolution unit 20 and a light incidence surface 32 of the optical scanner 30 may be equal to a distance of a light emitting surface 22 of the light resolution unit 20 and a light incidence surface 42 of the sensing unit 40.

The reason why the distances are equal is to measure the intensity and location of the light incident on the optical scanner 30.

Specifically, the intensity and location of the light incident on the optical scanner 30 may be designed to be equal to the intensity and location of the light incident on the sensing unit 40.

When the location of the light incident on the optical scanner 30 is moved as far as a first distance, it can be said that the location of the light incident on the sensing unit 40 is also moved as far as a first distance. Accordingly, variation of the locations is measured and color alignment can be compensated based on the measured variation.

A light passage of a first light 110 having arrived at the optical scanner 30 from the light resolution unit 20 is as long as a light passage of a second light 120 having arrived at the sensing unit 40 from the light resolution unit 20.

Alternatively, the time taken for the first light 110 to arrive at the optical scanner 30 from the light resolution unit 20 may be equal to the time taken for the second light 120 to arrive at the sensing unit 40 from the light resolution unit 20.

The light source unit 10 may emit laser beams and it may include at least one of a first light source 12 for generating a red light, a second light source 14 for generating a green light, a third light source 16 for generating a blue light and a fourth light source 18 for generating an infrared light.

The alignment compensation unit 50 may calculate variation of locations of the second light 120 sensed by the sensing unit 40 by time and compensate the color alignment, corresponding to the calculated location variation value.

The alignment compensation unit 50 may control an image processing unit 100 to process an image in accordance with location variation values and compensate color alignment.

In other words, the image processing unit 100 may horizontally and horizontally delay data enable of each color image and a pixel coordinate value for each color image as much as the calculated location variation value based on a control signal of the alignment compensation unit 50.

Accordingly, the alignment compensation unit 50 may calculate location variations of the second light 120 sensed by the sensing unit 40 by time and control the image processing unit 100 to correspond to the calculated location variation, only to compensate the color alignment.

Figure 6:
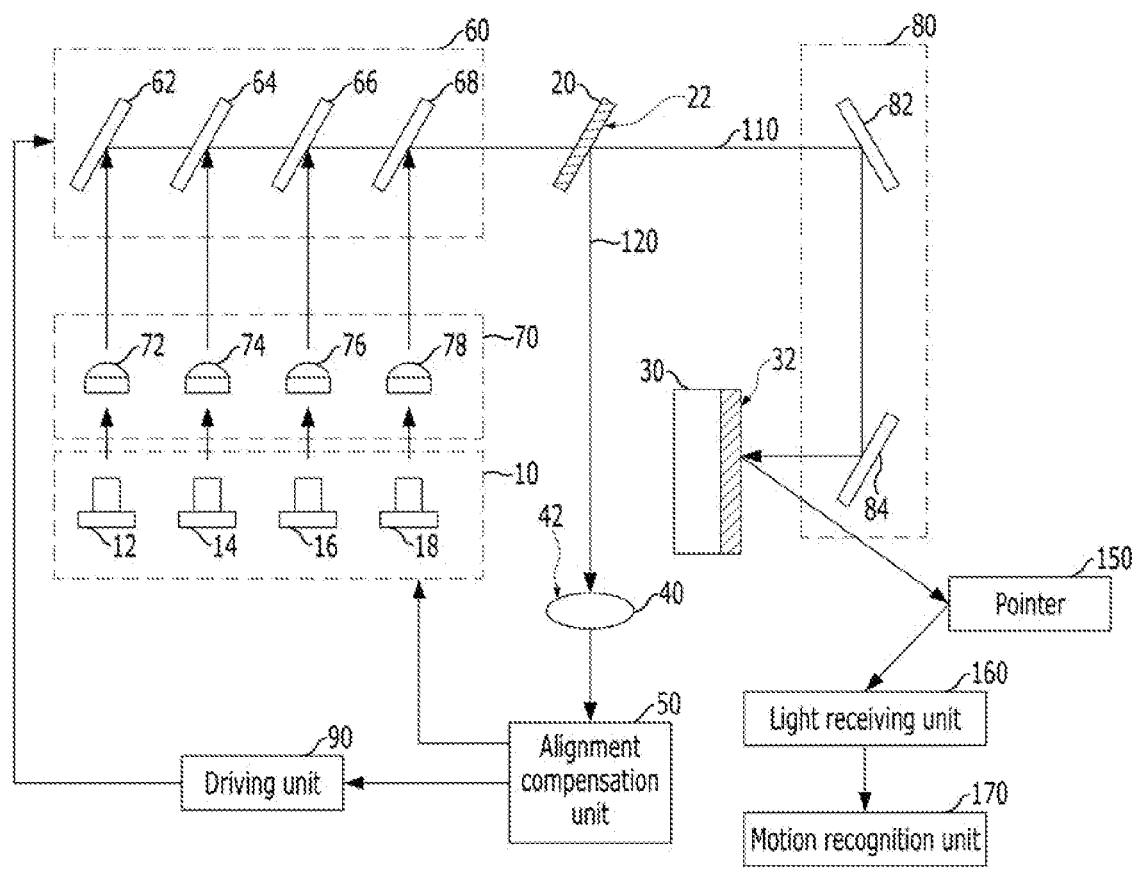
FIG. 6 is a diagram schematically illustrating a laser projection display according to a further embodiment of the present disclosure.
Figure 7:
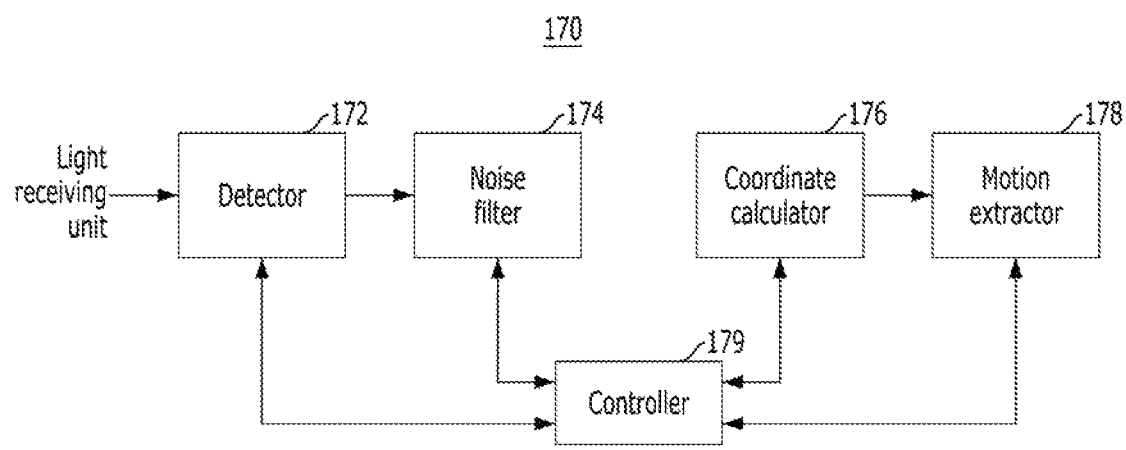
FIG. 7 is a block diagram illustrating a motion recognizing unit shown in FIG. 6.

FIG. 6 is a diagram schematically illustrating a laser projection display according to a further embodiment of the present disclosure. FIG. 7 is a block diagram illustrating a motion recognizing unit shown in FIG. 6.

The laser projection display shown in FIG. 6 may include a light source unit 10, a light resolution unit 20, an optical scanner 30, a sensing unit 40 and an alignment compensation unit 50.

At this time, a distance between a light emitting surface 22 of the light resolution unit 20 and a light incidence surface 32 of the optical scanner 30 may be equal to a distance of a light emitting surface 22 of the light resolution unit 20 and a light incidence surface 42 of the sensing unit 40.

The reason why the distances are equal is to measure the intensity and location of the light incident on the optical scanner 30.

Specifically, the intensity and location of the light incident on the optical scanner 30 may be designed to be equal to the intensity and location of the light incident on the sensing unit 40.

When the location of the light incident on the optical scanner 30 is moved as far as a first distance, it can be said that the location of the light incident on the sensing unit 40 is also moved as far as a first distance. Accordingly, variation of the locations is measured and color alignment can be compensated based on the measured variation.

A light passage of a first light 110 having arrived at the optical scanner 30 from the light resolution unit 20 is as long as a light passage of a second light 120 having arrived at the sensing unit 40 from the light resolution unit 20.

Alternatively, the time taken for the first light 110 to arrive at the optical scanner 30 from the light resolution unit 20 may be equal to the time taken for the second light 120 to arrive at the sensing unit 40 from the light resolution unit 20.

The alignment compensation unit 50 may calculate variation of locations of the second light 120 sensed by the sensing unit 40 by time and compensate the color alignment, corresponding to the calculated location variation value.

The laser projection display in accordance with the embodiment of the present disclosure may further include a light receiving unit 160 for receiving a light incident after the infrared light generated from the fourth light source 18 of the light source unit 10 and scanned by the optical scanner 30 is reflected from a preset pointer 150, and a motion recognition unit 170 for extracting motion of the pointer based on the intensity of the detected light received in the light receiving unit 160 and performing operations corresponding to the extracted motion.

The motion recognition unit 170 shown in FIG. 7 may include a detector 172, a noise filter 174, a coordinate calculator 176, a motion extractor 178 and a controller 179.

The detector 172 may detect the intensity of the light reflected from the pointer 150 through the light receiving unit 160. The noise filter 174 may remove a noise light which belongs to the other wavelength range, except a preset wavelength range, from the intensity of the detected light.

The coordinate calculator 176 may calculate x, y and z coordinates of the pointer based on the intensity of the light having the noise removed. The motion extractor 178 may extract the motion of the pointer based on the coordinates of the pointer.

The controller 179 may control the detector 172, the noise filter 174, the coordinate calculator 176 and the motion extractor 178 and perform operations corresponding to the extracted motion.

In the embodiment of the present disclosure, the motion recognition unit 170 may be arranged. Even when the motion of the pointer 150 is small or in remote, the motion of the pointer can be extracted precisely and accurately and the operations corresponding to the pointer motion can be performed precisely.

Accordingly, the laser projection display in accordance with the embodiment of the present disclosure may sense motion operations (e.g., proximity touch motion or a user's space gesture) and perform the motion operations precisely, such that the reliability of the laser projection display can be enhanced and the laser projection display can be widely used.

Figure 8:
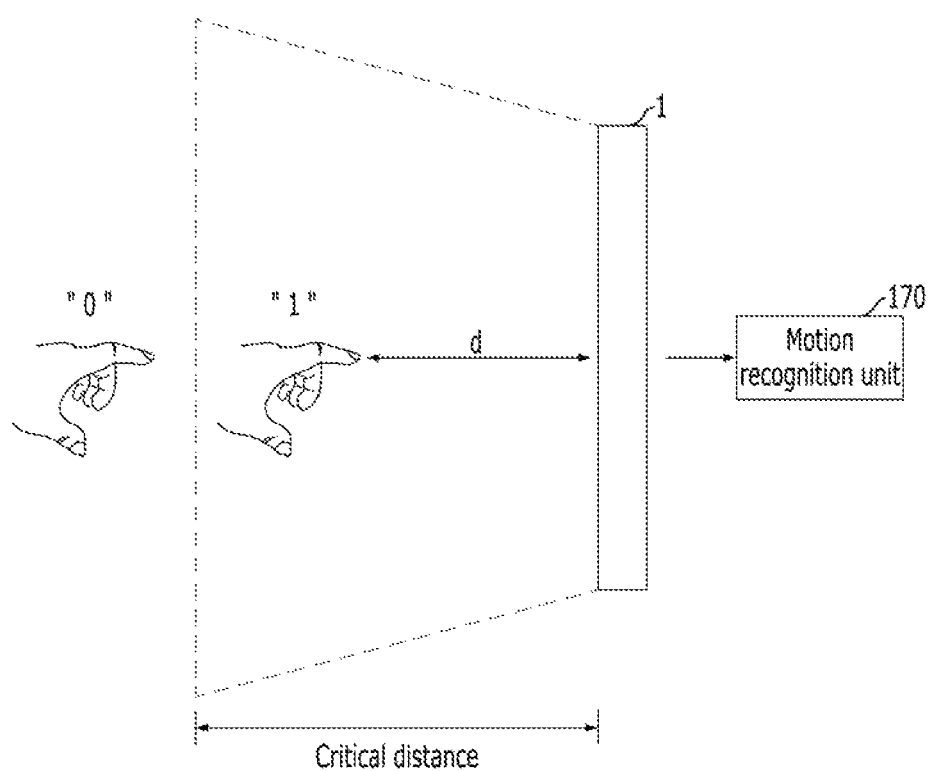
FIG. 8 is a diagram schematically illustrating a motion recognizing unit for recognizing motion of a pointer.

FIG. 8 is a diagram schematically illustrating the motion recognition unit for recognizing the motion of the pointer.

The motion recognition unit 170 shown in FIG. 8 may detect the intensity of the light reflected from the pointer spaced apart from a light emitting surface of the laser projection display 1 and extract the motion of the pointer based on the intensity of the detected light. Also, the motion recognition unit 170 may perform operations corresponding to the extracted motion.

The motion recognition unit 170 may calculate a distance (d) between the pointer and each of optical sensor modules based on an electrical signal transported from the light receiving unit.

Typically, the distance between the optical sensor module and the pointer may be in inverse proportion to the intensity of the reflected light measured in the light receiving unit.

Accordingly, the motion recognition unit 170 may use a distance between the light receiving unit and a light emitting unit irradiating light at a specific time point, when calculating the distance between the pointer and each optical sensor module at a specific time point.

At this time, the motion recognition unit 170 may acquire information on a distance between the pointer and each optical sensor module on a preset cycle.

The motion recognition unit 170 may include a detector, a noise filter, a coordinate calculator, a motion extractor and a controller.

FIG. 9 is a flow chart illustrating a method for color alignment of a laser projection display in accordance with the present disclosure.

The laser projection display shown in FIG. 9 resolves the laser light emitted from the light source unit into a first light for realizing an image and a second light for color alignment (S11).

The alignment compensation unit of the laser projection display may measure the intensity of the resolved second light and identify which the second light is out of red, green and blue lights, only to measure the location of the identified color light (S13).

Hence, the alignment compensation unit of the laser projection display calculates a relative location value between each corresponding color lights out of the measured location values of the color lights (S15).

The alignment compensation unit of the laser projection display checks whether the calculated relative value between the color lights is larger than a preset relative initial location value (S17).

When the relative location value for the color lights is larger than the preset relative initial location value based on the result of the checking, the alignment compensation unit of the laser projection display calculates location variation values and compensates color alignment in accordance with the calculated location variation values (S19).

The step of compensating the color alignment may calculate a rotation angle of the dichroic mirror arranged between the light source and the light resolution unit in accordance with the located variation value and compensates the color alignment by controlling the rotation of the dichroic mirror in accordance with the calculated rotation angle.

As the case may be, the step of compensating the color alignment may be performed by controlling the image processing unit to process the image based on the location variation value.

However, when the relative location value between the color lights is smaller than the preset relative location initial value, the step of calculating a relative location value between each corresponding color lights is performed repeatedly.

Next, the laser projection display checks whether the color alignment is complete (S21).

When the compensation of the color alignment is completed based on the result of the checking, all of the color alignment compensation process finishes. When the color alignment compensation is not completed based on the result of the checking, the step of resolving the laser light emitted from the light source unit into the first light for image realizing and the second light for color alignment is repeated.

The completion of the color alignment compensation may be determined by turning off of the laser projection display.

Before the laser light is incident on the optical scanner, some of the laser light is sensed and the location variation of the light may be calculated by time, such that color alignment may be automatically compensated to correspond to the calculated location variation value. Accordingly, the reliability of the laser projection display may be enhanced and resolution and brightness thereof may be also enhanced. Power consumption may be reduced and optical efficiency may be enhanced.

Furthermore, the surface of the optical scanner need not be checked to recognize the location of each color light in an assembling process and the cost of detection equipment may be lowered.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laser projection display comprising:
    a light source unit configured to emit laser light;
    a light resolution unit configured to resolve the laser light into a first light and a second light;
    an optical scanner configured to scan the resolved first light to a screen;
    a sensing unit configured to sense the resolved second light; and
    an alignment compensation unit configured to calculate a location variation value of the sensed second light and compensate color alignment to correspond to the calculated location variation value,
    wherein a distance between a light emitting surface of the light resolution unit and a light incidence surface of the optical scanner is equal to a distance between the light emitting surface of the light resolution unit and a light incidence surface of the sensing unit.

2. The laser projection display of claim 1, wherein a length of a passage of the first light arriving at the optical scanner from the light resolution unit is equal to a length of a passage of the second light arriving at the sensing unit from the light resolution unit.

3. The laser projection display of claim 1, wherein a time for the first light to arrive at the optical scanner from the light resolution unit is equal to a time for the second light to arrive at the sensing unit from the light resolution unit.

4. The laser projection display of claim 1, wherein the light source unit comprises at least a first light source for generating red light, a second light source for generating green light, a third light source for generating blue light and a fourth light source for generating infrared light.

5. The laser projection display of claim 4, further comprising a dichroic mirror unit located between the light source unit and the light resolution unit.

6. The laser projection display of claim 5, wherein the dichroic mirror unit comprises a first dichroic mirror corresponding to the first light source, a second dichroic mirror corresponding to the second light source, a third dichroic mirror corresponding to the third light source, and a fourth dichroic mirror corresponding to the fourth light source.

7. The laser projection display of claim 5, wherein the dichroic mirror unit comprises:
    a dichroic mirror comprising a shaft; and
    a driving unit configured to rotate a reflection surface of the dichroic mirror in response to a control signal from the alignment compensation unit.

8. The laser projection display of claim 5, further comprising a lens unit located between the light source unit and the dichroic mirror unit to parallelize the laser light.

9. The laser projection display of claim 1, wherein the light resolution unit is further configured to resolve the laser light into the first light and the second light at different rates.

10. The laser projection display of claim 9, wherein a resolution rate of the first light to the second light is 1:0.9~1:0.01.

11. The laser projection display of claim 1, wherein the sensing unit is a quadrant photodetector.

12. The laser projection display of claim 1, wherein the alignment compensation unit comprises:
    a color light identifier configured to measure an intensity of the sensed second light and to identify the second light as red, green, blue or infrared light based on the measured intensity;
    a location measurer configured to measure a location value of the identified red light, green light, or blue light;
    a first calculator configured to calculate a relative location value between corresponding color lights based on measured location values;
    a second calculator configured to compare the calculated relative location value with a preset relative location initial value and to calculate a location variation value based on the comparison; and
    a controller configured to control the color light identifier, the location measurer, and the first and second calculators and to compensate the color alignment based on the calculated location variation value.

13. The laser projection display of claim 12, further comprising a dichroic mirror located between the light source unit and the light resolution unit,
    wherein the controller is further configured to compensate the color alignment by calculating a rotation angle of the dichroic mirror and controlling rotation of the dichroic mirror based on the calculated rotation angle.

14. The laser projection display of claim 12, further comprising an image processing unit,
    wherein the controller is further configured to compensate the color alignment by controlling the image processing unit to process an image based on the location variation value.

15. The laser projection display of claim 12, wherein the controller is further configured to enhance an optical power of the laser light by controlling the light source unit when the measured intensity of the sensed second light is less than a reference value.

16. The laser projection display of claim 1, further comprising:

a light receiving unit configured to receive light incident thereon after the scanned first light is reflected from a preset pointer; and a motion recognition unit configured to:
  detect an intensity of the received incident light;
  recognize motion of the pointer based on the detected intensity; and
  perform an operation corresponding to the recognized motion.

17. The laser projection display of claim 16, wherein the motion recognition unit comprises:
  a detector configured to detect an intensity of the light reflected from the pointer;
  a noise filter configured to filter noise light that is within a non-preset wavelength range from the detected intensity of the light;
  a coordinate calculator configured to calculate x, y and z coordinates of the pointer based on an intensity of the filtered noise light;
  a motion extractor configured to recognize motion of the pointer based on the calculated coordinates; and
  a controller configured to control the detector, the noise filter, the coordinate calculator and the motion extractor and to perform an operation corresponding to the recognized motion.

18. A method for color alignment of a laser projection display in which a distance between a light resolution unit and an optical scanner is equal to a distance between the light resolution unit and a sensing unit, the method comprising:

resolving laser light emitted from a light source unit into a first light for realizing an image and a second light for the color alignment;
  measuring an intensity of the resolved second light;
  identifying the second light as red, green, blue or infrared light based on the measured intensity;
  measuring a location value of the identified light;
  calculating a relative location value between corresponding color lights based on measured location values of the red, green, and blue lights;
  comparing the calculated relative location value with a preset relative initial value;
  calculating a location variation value based on the comparison; and
  compensating the color alignment based on the calculated location variation value.

19. The method of claim 18, wherein the compensating the color alignment comprises:
  calculating a rotation angle of a dichroic mirror located between the light source unit and the light resolution unit; and
  controlling rotation of the dichroic mirror based on the calculated rotation angle.

20. The method of claim 18, wherein the compensating the color alignment comprises controlling an image processing unit to process an image based on the location variation value.

* * * * *